(12) United States Patent
Holslin et al.

(10) Patent No.: US 7,430,479 B1
(45) Date of Patent: Sep. 30, 2008

(54) SYSTEM AND METHOD FOR ANALYZING CONTENT DATA

(75) Inventors: Daniel Holslin, San Diego, CA (US); Giancarlo Borgonovi, Encinitas, CA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/193,529

(22) Filed: Aug. 1, 2005

Related U.S. Application Data

(60) Provisional application No. 60/602,041, filed on Aug. 17, 2004.

(51) Int. Cl.
*G21G 1/06* (2006.01)
(52) U.S. Cl. ............... 702/22; 702/19; 702/23; 702/30; 702/31; 702/32; 702/124; 702/189; 376/158; 376/159; 376/165; 376/166; 250/390.04; 250/359.1; 250/393
(58) Field of Classification Search ............ 702/19, 702/22, 27, 28, 30, 32, 40, 23, 31, 124, 183, 702/188, 189; 250/390.04, 358.1, 356.2, 250/390.07, 390.02, 359.1, 393; 376/158, 376/159, 165, 166
See application file for complete search history.

(56) References Cited

U.S. PATENT DOCUMENTS

| 3,636,353 | A |   | 1/1972 | Untermyer | 250/83.1 |
| 3,930,152 | A |   | 12/1975 | Pitts, Jr. | 250/269 |
| 3,940,611 | A |   | 2/1976 | Arnold | 250/269 |
| 3,940,613 | A |   | 2/1976 | Paap | 250/269 |
| 3,973,131 | A |   | 8/1976 | Malone et al. | 250/502 |
| 3,979,300 | A |   | 9/1976 | Paap et al. | 250/265 |
| 4,031,367 | A | * | 6/1977 | Murphy | 702/6 |
| 4,122,339 | A |   | 10/1978 | Smith, Jr. et al. | 250/264 |
| 4,180,730 | A |   | 12/1979 | Givens et al. | 250/265 |
| 4,292,518 | A |   | 9/1981 | Johnstone | 250/262 |
| 4,483,816 | A |   | 11/1984 | Caldwell et al. | 376/158 |
| 4,497,768 | A |   | 2/1985 | Caldwell et al. | 376/153 |

(Continued)

FOREIGN PATENT DOCUMENTS

WO      WO 90/13900       11/1990

(Continued)

OTHER PUBLICATIONS

U.S. Appl. No. 60/524,551.*

(Continued)

*Primary Examiner*—Carol S Tsai
(74) *Attorney, Agent, or Firm*—King & Spalding LLP

(57) ABSTRACT

The system and method provide security and cargo handling personnel a versatile tool to rapidly check cargo for hidden radiological materials, explosives, drugs, and chemical weapons material. Gamma ray emission is stimulated by a pulsed neutron source. The gamma ray signature is used to classify the material. Passive gamma ray analysis can be used to detect and identify radiological material. The method of determining the contents of a target includes irradiating a target; detecting at least one spectrum emitted from the target; performing a primary analysis to extract a first set of indicators; and performing a secondary analysis to decide the contents of the target. The primary analysis utilizes either a least squares analysis or principal component analysis. The secondary analysis utilizes a generalized likelihood ratio test or support vector machines.

28 Claims, 10 Drawing Sheets

U.S. PATENT DOCUMENTS

| | | | | |
|---|---|---|---|---|
| 4,620,100 | A | 10/1986 | Schoenig, Jr. et al. | 250/358.1 |
| 4,657,724 | A | 4/1987 | Peelman | 376/119 |
| 4,851,687 | A | 7/1989 | Ettinger et al. | 250/390.04 |
| 4,918,315 | A * | 4/1990 | Gomberg et al. | 250/390.04 |
| 5,068,532 | A * | 11/1991 | Wormald et al. | 250/269.2 |
| 5,098,640 | A * | 3/1992 | Gozani et al. | 376/166 |
| 5,124,554 | A * | 6/1992 | Fowler et al. | 250/358.1 |
| 5,200,626 | A * | 4/1993 | Schultz et al. | 250/390.04 |
| 5,365,426 | A * | 11/1994 | Siegel et al. | 600/509 |
| 5,539,788 | A | 7/1996 | Ruddy et al. | 376/159 |
| 5,631,831 | A * | 5/1997 | Bird et al. | 701/29 |
| 5,692,029 | A * | 11/1997 | Husseiny et al. | 378/88 |
| 5,838,759 | A * | 11/1998 | Armistead | 378/57 |
| 5,886,430 | A * | 3/1999 | Ralson et al. | 307/126 |
| 5,982,838 | A | 11/1999 | Vourvopoulos | |
| 6,032,102 | A | 2/2000 | Wijeyesekera et al. | 702/8 |
| 6,066,901 | A | 5/2000 | Burkhart et al. | 307/106 |
| 6,320,193 | B1 | 11/2001 | Morrison et al. | 250/393 |
| 6,393,085 | B1 | 5/2002 | Heller et al. | 376/158 |
| 6,438,189 | B1 | 8/2002 | Vourvopoulos | 376/159 |
| 6,507,025 | B1 | 1/2003 | Verbinski et al. | 250/358.1 |
| 6,560,546 | B1 * | 5/2003 | Shenk et al. | 702/30 |
| 6,563,898 | B1 * | 5/2003 | Vourvopoulos et al. | 376/159 |
| 6,692,971 | B2 * | 2/2004 | Shushan et al. | 436/173 |
| 6,928,131 | B2 | 8/2005 | Olshansky et al. | 376/158 |
| 7,049,581 | B2 * | 5/2006 | Whitney et al. | 250/282 |
| 7,120,226 | B2 * | 10/2006 | Ledoux et al. | 378/57 |
| 2003/0152186 | A1 * | 8/2003 | Jurczyk et al. | 376/109 |
| 2003/0177525 | A1 * | 9/2003 | Fender et al. | 800/279 |
| 2004/0059530 | A1 * | 3/2004 | Paulse et al. | 702/76 |
| 2004/0114716 | A1 | 6/2004 | Cole | 378/57 |
| 2004/0233425 | A1 * | 11/2004 | Long et al. | 356/301 |
| 2007/0278415 | A1 * | 12/2007 | Gentile et al. | 250/393 |

FOREIGN PATENT DOCUMENTS

| | | |
|---|---|---|
| WO | WO 97/11388 | 3/1997 |

OTHER PUBLICATIONS

Dep and Vourvopoulos, "Pulsed Fast and Thermal Neutron Analysis for Coal and Cement Industries," Department of Physics and Astronomy, Western Kentucky University, Bowling Green, KY 42101, 4pp.

Belbot, Vourvopoulos, Womble, and Paschal, "A Prototype Elemental Coal Analyzer Based on Pulsed Neutrons," Applied Physics Institute, Dept. of Physics and Astronomy, Western Kentucky University, 1 Big Red Way, Bowling Green, KY 42101, 12pp.

Belbot, Vourvopoulos, Womble, and Paschal, "Elemental On-line Coal Analysis Using Pulsed Neutrons," Applied Physics Institute, Dept. of Physics and Astronomy, Western Kentucky University, 1 Big Red Way, Bowling Green, KY 42101, 10pp.

Belbot, Vourvopoulos, and Paschal, "A Commercial On-line Coal Analyzer Using Pulsed Neutrons," Applied Physics Institute, Dept. of Physics and Astronomy, Western Kentucky University, 1 Big Red Way. Bowling Green, KY 42101, 4pp.

Vourvopoulos, Dep, Paschal, and Spichiger, "PELAN—A Transportable, Neutron-Based UXO Identification Technique," Applied Physics Institute, Dept. of Physics and Astronomy, Western Kentucky University, 1 Big Red Way, Bowling Green, KY 42101, 8pp.

Womble, Campbell, Vourvopoulos, Paschal, Gacsi, and Hui, "Detection of Explosives With the PELAN System," Applied Physics Institute, Dept. of Physics and Astronomy, Western Kentucky University, 1 Big Red Way, Bowling Green, KY 42101, 4pp.

Womble, Vourvopoulos, and Paschal, "Detection of Landmines Using the PELAN System," Applied Physics Institute, Dept. of Physics and Astronomy, Western Kentucky University, 1 Big Red Way, Bowling Green, KY 42101, 4pp.

Womble, Vourvopoulos, Paschal, Novikov, and Chen, "Optimizing the Signal to Noise Ratio for the PELAN System," Applied Physics Instiute, Dept. of Physics and Astronomy, Western Kentucky University, 1 Big Red Way, Bowling Green, KY 42101, 4pp.

Womble, Vourvopoulos, Novikov, and Paschal, "PELAN 2001: Current Status of the PELAN Explosive Detection System," Applied Physics Institute, Dept. of Physics and Astronomy, Western Kentucky University, 1 Big Red Way, Bowling Green, KY 42101, 6pp.

Vourvopoulos, and Womble, "Pulsed Fast/Thermal Neutron Analysis: A Technique for Explosives Detection," Applied Physics Institute, Dept. of Physics and Astronomy, Western Kentucky University, 1 Big Red Way, Bowling Green, KY 42101, 9pp.

Womble, Vourvopoulos, Paschal, Novikov, and Barzilov, "Results of Field Trials for the PELAN System," Applied Physics Institute, Dept. of Physics and Astronomy, Western Kentucky University, 1 Big Red Way, Bowling Green, KY 42101, 6pp.

Holslin, Forsht, Novikov, Paschal, Vourvopoulos, and Womble, "Results of Recent UXO Field Test at Indian Head with PELAN," Department of Physics and Astronomy, Western Kentucky University, Bowling Green, KY 42101, 6pp.

Womble, Paschal, Cantrell, Belot, and Hopper, "Evaluation of UXO Discrimination Using PELAN," Applied Physics Institute, Dept. of Physics and Astronomy, Western Kentucky University, 1 Big Red Way, Bowling Green, KY 42101, 4pp.

Rosengard, Dolan, Miklush, and Samiel, "Humanitarian Demining Nuclear Techniques May Help the Search for Landmines," IAEA Bulletin, 43/2/2001, 4pp.

"PELAN—A Transportable, Neutron-Based UXO Identification Probe," http://www.estcp.org/projects/uxo/2001060o.cfm printed Jun. 3, 2005, 2 pp.

Vourvopoulos and Thornton, "A Transportable, Neutron-Based Contraband Detection System," 10pp.

Hui, Vourvopoulos, Womble, Paschal, and Gacsi, "NELIS—An Illicit Drug Detection System," Applied Physics Institute, Dept. of Physics and Astronomy, Western Kentucky University, 1 Big Red Way, Bowling Green, KY 42101, 4pp.

Barzilov, Womble, and Vourvopoulos, "NELIS—A Neutron Elemental Inspection System of Commodities of Pallets," Applied Physics Institute, Dept. of Physics and Astronomy, Western Kentucky University, 1 Big Red Way, Bowling Green, KY 42101, 5pp.

Schultz, Vourvopoulos, Womble, and Roberts, "NELIS—A Neutron Elemental Inspection System of Commodities of Pallets," 8pp.

Borgonovi, G.M., et al., "Data analysis for classification of UXO filler using pulsed neutron techniques." (8 pp).

Moss, C.E., et al., "Neutron Detectors for Active Interrogation of Highly Enriched Uranium," *IEEE Transactions on Nuclear Science*, vol. 51, No. 4, pp. 1677-1681, Aug. 2004.

Proposal 01-0488-71-2004-435 for "Cargo Material Inspection System (CAMIS), Technical Proposal," 32 pp., Jan. 12, 2004.

BAA No. DSWC 04-02, Quad Chart for "Rapid Multi-Phase Cargo Screening with the CAMIs Pulsed Neutron System," 1 p., Feb. 22, 2004.

BAA No. BAA 04-02, White Paper for "Rapid Multi-Phase Cargo Screening with the CAMIS Pulsed Neutron System," 4 pp.

BAA No. BAA 04-02, Quad Chart for Cargo Material Inspection System—Special Nuclear Materials (CAMIS-SNM), 1 p., dated Feb. 24, 2004.

White Paper for "Cargo Material Inspection System—Special Nuclear Materials (CAMIS-SNM)," 4 pp.

Sprouse, D., "Screening Cargo Containers," *S& TR*, pp. 12-15, May 2004.

Dokhale, P.A., et al., "NELIS—An Illicit Drug Detection System," *Application of Accelerators in Research and Industry, Sixteenth International Conference*, pp. 1061-1064, 2001.

Saurel, N., et al., "Tomography Applied to Actinides Detection by Photofission," *2000 IEEE Nuclear Science Symposium, Conference Record*, vol. 3, pp. 27/21-27/26, 2000.

Rynes, J., et al., "Gamma-Ray and Neutron Radiography as Part of a Pulsed Fast Neutron Analysis Inspection System," *Nuclear Instruments and Methods in Physics Research A*, vol. A422, pp. 895-899, 1999.

Gilchrist, W.A., Jr., et al., "Introduction of a New Through-Tubing Multifunction Pulsed Neutron Instrument," *Society of Petroleum Engineers (SPE) Annual Technical Conference and Exhibition, Volume Omega: Formation Evaluation and Reservoir Geology*, pp. 817-827, Oct. 1999 (Abstract Only).

Rooney, B.D., et al., "Active Neutron Interrogation Package Monitor," *Nuclear Science Symposium, Conference Record*, vol. 2, pp. 1027-1030, Nov. 1998.

Patel, Jagdish U., "Results From the Latest Measurements Done at the WKU Applied Physics Laboratory," 9 pp., Oct. 23, 1995.

Micklich, B.J., et al., "Accelerator Requirements for Fast-Neutron Interrogation of Luggage and Cargo," *Proceedings of the 1995 Particle Accelerator Conference*, vol. 1, pp. 110-112, 1995.

Armitage, B.H., et al., "Limitations to the Accurate Assessement of Waste Actinide Content by Neutron Interrogation," *Conference Record of the 1992 IEEE Nuclear Science Symposium and Medical Imaging Conference*, vol. 1, pp. 703-705, 1992.

Moss, C.E., et al., "Detection of Uranium-Based Nuclear Weapons Using Neutron-Induced Fission," *Conference Record of the 1991 IEEE Nuclear Science Symposium and Medical Imaging Conference*, vol. 2, pp. 1218-1221, 1991.

Walker, John, "Uses of Neutrons in Engineering and Technology," *Physics Technology*, vol. 13, pp. 239-248, 1982.

Badurek, G., et al., "Fourier Neutron Time-of-Flight Diffractometer," *Atomkernenergie*, vol. 29, No. 1, pp. 27-29, Jan. 1997 (Abstract Only).

Schultz, et al., "A Feasibility Study for a Linac-Based Transuranic Waste Characterization System" [online], [retrieved on Jun. 3, 2005], 8 pp., Retrieved from the Internet: http://www.wku.edu/API/publications/publications.htm.

Fetter, Steve, et al., "Detecting Nuclear Warheads," *Science & Global Security*, vol. 1, pp. 225-253, 1990.

Fetter, Steve, et al., "Appendix A—Fissile Materials and Weapon Design," *Science & Global Security*, vol. 1, pp. 255-263, 1990.

Fetter, Steve, et al., "Appendix B—Emission and Absorption of Radiation," *Science & Global Security*, vol. 1, pp. 265-285, 1990.

Mozley, Robert, "Appendix C—Particle Sources and Radiography," *Science & Global Security*, vol. 1, pp. 287-302, 1990.

BAA No. 02-Q-4655, Quad Chart for "Nuclear Material Detection System," 1p., Dec. 19, 2001.

Proposal No. 01-0488-0980-022, "Man-Portable Explosives Detection and Characterization System," Technical and Cost Proposal, 42 pp., Nov. 17, 1997.

\* cited by examiner

SYSTEM AND METHOD FOR ANALYZING CONTENT DATA

CROSS-REFERENCE TO RELATED APPLICATIONS

The current application claims priority to and incorporates by reference in its entirety U.S. Provisional Patent Application No. 60/602,041, entitled METHODS FOR ANALYZING TARGET EMISSIONS, filed Aug. 17, 2004. This application also incorporates by reference in its entirety U.S. patent application Ser. No. 11/033,552, entitled, SYSTEM AND METHOD FOR MEASURING AND ANALYSING TARGET EMISSIONS, filed Jan. 12, 2005.

BACKGROUND OF THE INVENTION

1. Field of the Invention

The invention relates generally to the field of target inspection to determine the contents thereof through radiation detection. The invention relates more specifically to the use of inspection systems and methods.

2. Description of the Related Art

Preventing the trafficking of illegal and dangerous substances, as well as the security of various localities, rests in the ability to assess the contents of a suspected target, such as a vehicle or cargo. These targets may contain a variety of materials, including explosives, chemical agents, or illicit drugs. Successful safety and homeland security requires confronting the trafficking of these targets, which may also include weapons of mass destruction and the fundamental building blocks thereof, i.e., fissionable materials, that are increasingly being trafficked.

Inspection stations are established to reduce the flow or entry of illicit contraband. The role of the current inspection systems at the inspection stations is now being amplified to look not only for illicit drugs, but also for explosives and weapons of mass destruction. Currently, these inspection systems are "anomaly" detectors. When an anomaly is detected, it can only be identified through an intrusive manual inspection, which is inherently limited by the ability, condition, and initiative of inspection personnel.

Other conventional methods for assessment of whether a vehicle, container, or other target contains dangerous or illicit materials may be limited to external markings and visual examination by trained experts. Often, the target is weathered or corroded and the markings and external visual cues are deteriorated or absent. Alternatively, the target may conceal the dangerous material. If a conservative approach is used and all questionable targets are treated as explosive or chemical filled, the cost of clearance operations is greatly increased. If a less conservative approach is used, accidents can occur that lead to injury or loss of life.

The time to visually inspect and assess a target is an inefficient process. This costly and time consuming operation exposes inspection personnel to serious risks and has resulted in increasing delays. Often, the system lacks the specificity to clearly identify the nature of an anomaly, thereby necessitating additional resources and/or the destruction of unverifiable suspect items.

SUMMARY OF THE INVENTION

Summary of the Problem

There is currently a need for the ability to inspect targets, e.g., vehicles and cargo, to determine whether the target contains dangerous or illicit materials in order to prevent the movement or entry of the illegal contraband. There is a need for a more efficient inspection system to rapidly assess a target and make a determination of the contents of the target. Additionally, a system is desired that is more accurate, providing fewer false alarms and relying less on human interaction. A means of rapidly and correctly determining the contents of a target is needed to allow rapid disposition and proper handling of explosive or chemical material. Additionally, a method and system is needed for non-intrusively identifying targets in-situ for more cost-effective and safer environmental remediation.

It is also desired to have a system and method to provide the nation's domestic security forces with an optionally portable system to identify threat material. The focus is typically on explosives, with additional capabilities of identifying chemicals, radiological isotopes, and drugs. For example, a desired system and method can recognize and identify explosives hidden in common packages such as boxes and briefcases, identify contents of improvised explosive devices ("IEDs") such as pipe bombs, detect caches of explosives in car trunks or van interiors, and detect hidden illicit drugs. The system and method can also identify concealed targets, such as a detection of mines in the ground.

Summary of the Solution

The solution system and method described herein are based on neutron interrogation used to inspect targets, e.g., vehicles and cargo, for prohibited materials including, inter alia, explosives, chemical warfare agents, illicit drugs, and other hazardous materials.

In a first embodiment of the present invention, a method for analyzing target interrogation data is described. The method comprises collecting target interrogation data, wherein the target interrogation data comprises spectra that is representative of the contents of the target; performing a primary analysis of the spectra according to a least squares analysis to determine a first set of elemental intensities representative of the contents of the target; performing a secondary analysis of the spectra utilizing the first set of elemental intensities by comparing the first set of elemental intensities from the target to a second set of elemental intensities for known spectra; and classifying the contents of the target based on the secondary analysis comparison.

In a second embodiment of the present invention, a method for analyzing target interrogation data is described. The method comprises collecting target interrogation data, wherein the target interrogation data comprises spectra that is representative of the contents of the target; performing a primary analysis of the spectra according to a principal component analysis to determine a first set of vectors representative of the contents of the target; performing a secondary analysis of the spectra utilizing the first set of vectors be comparing the first set of vectors from the target to a second set of vectors for known spectra; and classifying the contents of the target based on the secondary analysis comparison.

In a third embodiment of the present invention, an interrogation system for determining the contents of a target is described. The interrogation system comprises at least one detector configured to provide spectra representative of the target; a primary analysis application to perform a least squares analysis of the spectra to determine a first set of elemental intensities representative of the contents of the target; and a secondary analysis application to perform an analysis of the spectra utilizing the first set of elemental intensities by comparing the first set of elemental intensities from the target to a second set of elemental intensities for known spectra; wherein the system classifies the contents of the target based on the secondary analysis application comparison.

In a fourth embodiment of the present invention, an interrogation system for determining the contents of a target is described. The interrogation system comprises at least one detector configured to provide spectra representative of the target; a primary analysis application to perform a principal component analysis to determine a first set of vectors representative of the contents of the target; and a secondary analysis application to perform an analysis of the spectra utilizing the first set of vectors be comparing the first set of vectors from the target to a second set of vectors for known spectra; wherein the system classifies the contents of the target based on the secondary analysis application comparison.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The present invention will be more clearly understood from a reading of the following description in conjunction with the accompanying figures wherein.

DETAILED DESCRIPTION OF THE PREFERRED EMBODIMENTS OF THE PRESENT INVENTION

Figure 1:
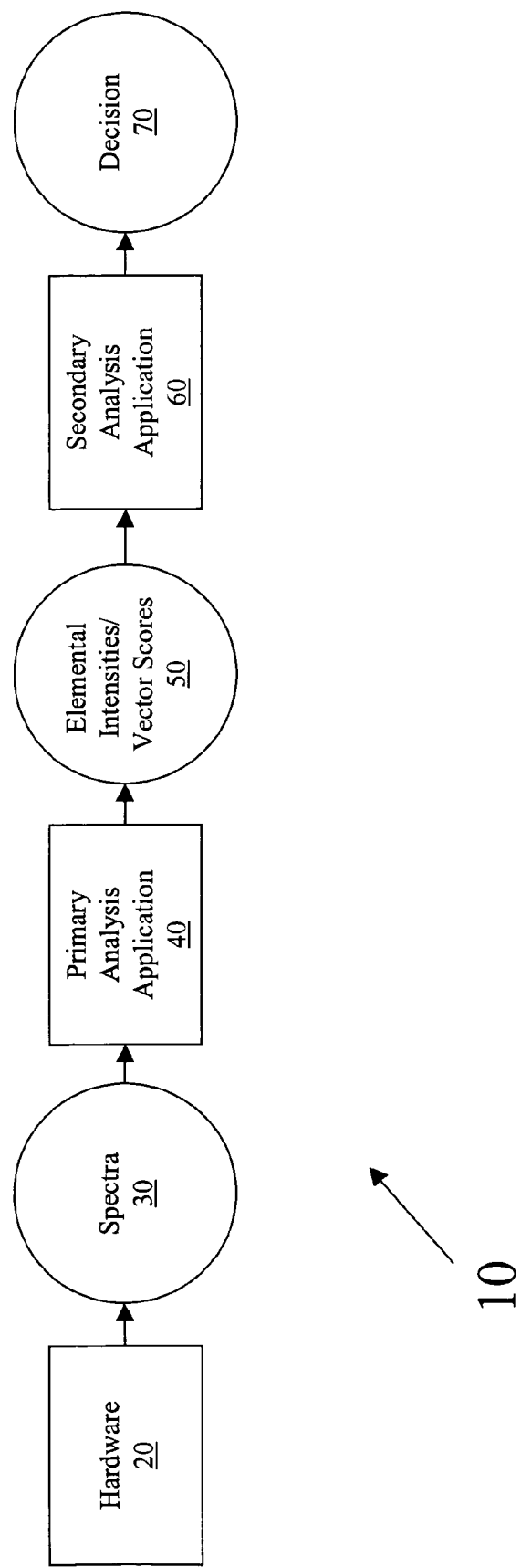
FIG. 1 shows process steps for data analysis according to an embodiment of the present invention.

Reference will now be made in detail to the preferred embodiments of the present invention, examples of which are illustrated in the accompanying drawings.

The system and method of the present invention analyze data regarding the contents of a target to determine whether the target contains dangerous or illicit contents. Further, the system and method provide a classification to discern whether the contents contain an improper substance for handling, removing, isolating, or other future action. For example, the contents of the target can be classified as "explosive" or "inert," or as "containing illicit drugs" or "not containing illicit drugs," and the like. The system may also classify the contents as "unknown." Although the present invention can be applied to a variety of target contents, the description herein often describes the method of determining whether the target is "explosive" or "inert." However, references to these classifications are merely exemplary and the present invention is not intended to be limited only to the detection of explosive targets.

Given the fact that chemical elements and elemental ratios are quite different for innocuous substances, drugs, explosives, chemical warfare agents, etc., the system and method described herein are applicable in a variety of situations, e.g., identification of filler of shells, differentiating chemical agents from innocuous or high explosive fillers, confirming buried landmines, etc. More specifically, the inspection is intended to be used in a variety of applications including, but not limited to, improvised explosive devices ("IEDs") and radiological dispersal devices ("RDDs"), chemical warfare agents ("CWA") in various containers, drugs (e.g., cocaine) in sea vessels, drug stimulant in a pallet, explosives, confirmation sensor for humanitarian demining, shells over a range of sizes and fills, and detecting a bomb in a vehicle. Examples of target contents to be identified include, but are not limited to, explosives (e.g., RDX, TNT, PETN, ANFO, black powder, smokeless, Pyrodex), radioactive isotopes (e.g., Cobalt ($^{60}$Co), Cesium ($^{137}$Cs), depleted Uranium ($^{238}$U), Americium ($^{241}$Am)), and miscellaneous or innocuous contents (e.g., ammonia, bleach, water, gasoline, diesel fuel). The system can recognize these contents in a plurality of different targets used as a concealment including, but not limited to, metal toolboxes filled with tools, canvas gym bags filled with clothes, cardboard and plastic boxes, rolling suitcases filled with clothes, leather briefcases filled with papers, and metal/pvc/abs pipe bombs. Additionally, the system can also identify a background such as metal tables, concrete, dirt, carpet, and sand.

High explosives (e.g., TNT, RDX, C-4) are composed primarily of the chemical elements hydrogen, carbon, nitrogen, and oxygen. Similarly, illicit drugs are typically composed of high amounts of hydrogen and carbon and, in many instances, show a strong chlorine signature. Many innocuous materials are also primarily composed of these same elements, but the elemental ratios and concentrations are unique to each material. The table below shows the atomic density of elements for various materials along with the atomic ratios. The problem of identifying explosives and illicit drugs is thereby reduced to the problem of elemental identification. Nuclear techniques exhibit a number of advantages for non-destructive elemental characterization. These include the ability to examine bulk quantities with speed, high elemental specificity, and no memory effects from the previously measured object.

| Density or Ratio | H | C | N | O | Cl | C/O | C/N | Cl/O |
|---|---|---|---|---|---|---|---|---|
| Narcotics | High | High | Low | Low | | Medium | High >3 | High | Very High |
| Explosives | Low-Medium | Medium | High | Very High | Medium to None | Low <1 | Low <1 | Low to Medium |
| Plastics | Medium-High | High | High to Low | Medium | Medium to None | Medium | Very High | — |

Nuclear interrogation can provide a means of rapidly and correctly determining the contents, thereby allowing rapid disposition and proper handling of explosive or chemical filled material. Nuclear interrogation allows the system to non-intrusively and quickly identify the contents of a target in-situ for more cost-effective and safer environmental remediation.

Referring to FIG. 1, a process 10 for inspecting a target according to an embodiment of the present invention is shown. Hardware 20 irradiates the target. Spectra 30 emits from the target due to the radiation. The hardware 20 detects and analyzes the spectra 30 in a primary analysis application 40. The primary analysis application 40 provides elemental intensities 50, vector scores, or the like, which is representative of the contents of the target. A secondary analysis application 60 analyzes the data from the primary analysis application 40 to render a decision 70 regarding the contents of the target.

The chemical elements of interest for the detection of illicit drugs or explosives require different neutron energies in order to be observed. Elements such as H, Cl, and Fe are best observed through nuclear reactions initiated from very low energy neutrons. Other elements, such as C and O, need neutron energies of several MeV to be observed reliably. To satisfy this range of neutron energies, a neutron source is required that can produce the high-energy neutrons for measurement of elements such as C and O, as well as low energy neutrons (e.g., energy less than 0.025 eV) for elements such as H and Cl. This can be accomplished with the use of a pulsed neutron generator.

The pulsed neutron generator emits penetrating neutrons that interact with the nuclei of the chemical elements in the target. As a result of these interactions, the chemical agents in the target material, e.g., H, C, N, and O, emit characteristic gamma-rays that are the "fingerprints" of those elements. The gamma ray energy is characteristic of the nuclei with which the reaction occurred, and can therefore be used as an indicator of a particular atomic species. Because different interactions produce prompt or delayed emission, neutron pulses and gated detectors have the advantage of providing more than one spectrum, as compared to continuous neutron fluxes. Thus, the system can separate the fast inelastic, capture, and activation components, and make available more information that can be used to infer the elemental composition of the irradiated target. By examining the elemental composition of the object, the system is able to automatically differentiate and classify the item into various categories, such as explosives, illicit drugs, industrial chemical agents, and the like. This classification process provides a safe mechanism for the non-intrusive and non-destructive testing of many hazardous materials.

Figure 2:
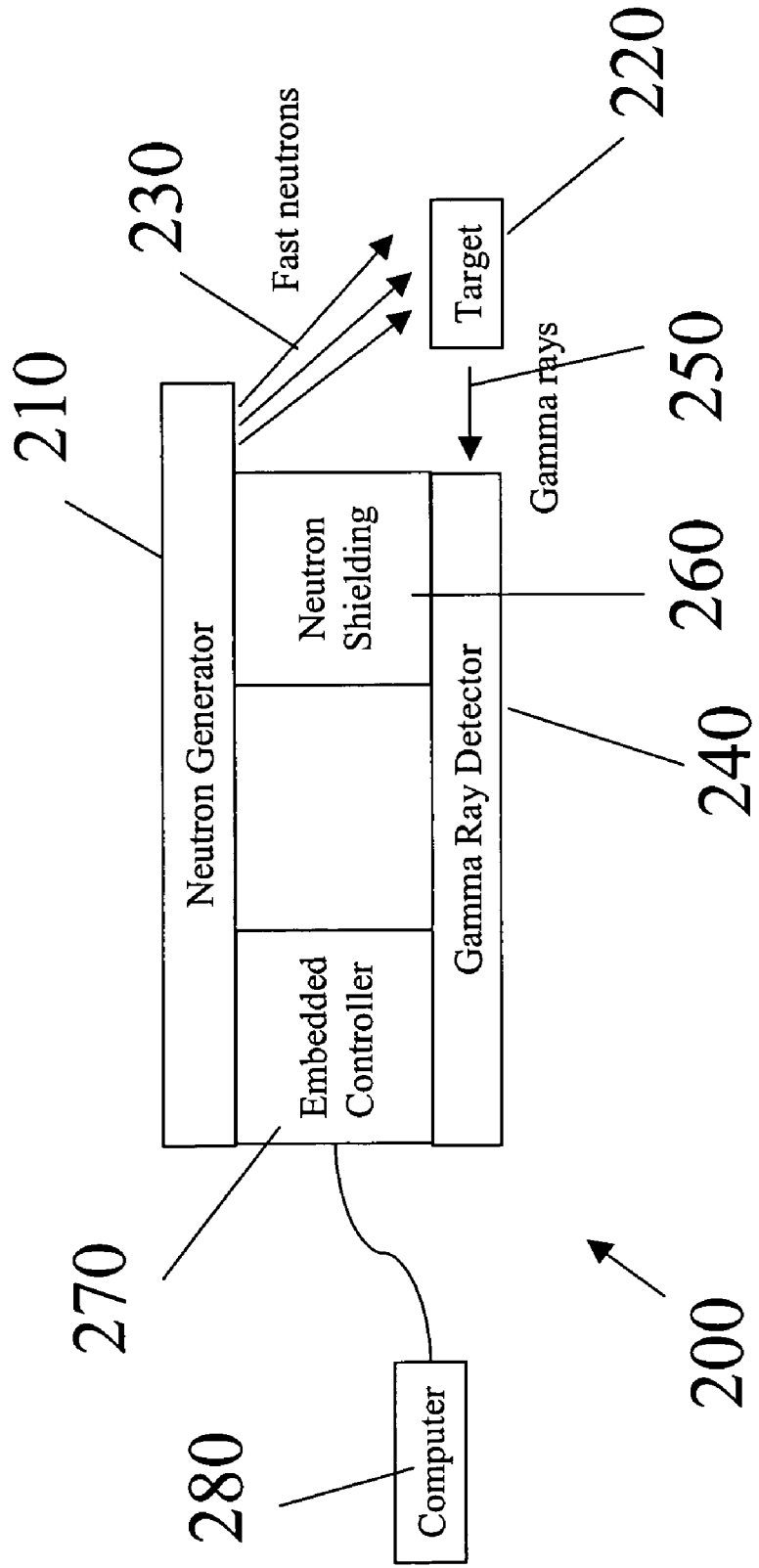
FIG. 2 shows a schematic figure of a prior art system.

Referring to FIG. 2(a), a schematic figure of a conventional inspection system 200 is shown. The system 200 has a neutron source 210, such as a pulsed neutron generator, that irradiates a target 220 with pulsed neutrons 230. However, any neutron source or interrogation process may be used, such as those disclosed in exemplary processes described in U.S. Pat. Nos. 5,982,838 and 6,563,898, which are incorporated herein by reference in their entirety. Irradiating a substance with pulsed neutrons 230 results in several types of interactions that cause the emission of gamma rays 250. The energy of these gamma rays 250 is characteristic of the nuclei with which the reaction occurred and can, therefore, be used as an indicator of the presence of an atomic species. Additionally, the pulsed neutron generator 210 makes it possible to separate the gamma spectra into inelastic and capture components that are easier to interpret.

The pulsed neutron generator 210 produces neutrons by creating deuterium ions and accelerating these ions onto a tritiated target. The neutrons are generated by applying a DC high voltage (e.g., of the order of 100 kV) between the cathode and the tritiated target. Deuterium atoms are emitted from the cathode when it is heated. These atoms are then ionized and accelerated in a high voltage field of up to about 100 kV to impinge on tritium atoms in the target. The fusion of deuterium and tritium nuclei creates neutrons with an energy of about 14 MeV. The deuteron beam is pulsed by applying a gated voltage, e.g., 2-3 kV, between the cathode and an intermediate electrode. The neutrons are produced isotropically and diffuse through the target.

The system is controllable between three detection/timing modes. The modes comprise, for example, when the neutron generator is "off" for a predetermined amount of time (Mode 1), the neutron generator pulsing at 10 Hz/10 microseconds (Mode 2), and the neutron generator pulsing at 200-400 kHz/25-200 microseconds (Mode 3). Utilizing the system in these three modes to inspect a target facilitates data collection in both passive and active modes for both passive and stimulated emissions of gamma and neutron radiation.

The neutron generator, operating at 14 MeV, can be configured to pulse neutrons approximately 2-10 μs wide in a first frequency range of approximately 5,000-10,000 Hz, in order to excite and detect gamma radiation from a first class of prohibited materials, e.g., explosives, chemical warfare agents, and illicit drugs. The emitted gamma radiation from the target is detected and subjected to chemical elemental analysis. A detailed description of an exemplary chemical elemental analysis method is described below, as well as in U.S. Pat. Nos. 5,982,838 and 6,563,898. The same neutron generator also uses pulsed neutrons that are approximately 25-200 μs wide in a second frequency range, e.g., 200-400 Hz, in order to excite and detect neutron radiation from a second class of prohibited materials, e.g., nuclear materials such as $^{235}$U or $^{240}$Pu. The system can also be utilized in a passive mode in order to detect gamma and/or neutron radiation emitted from the target without the need for active interrogation.

Neutrons can initiate several types of nuclear reactions (e.g., (n,n'γ), (n,pγ), (n,γ), etc.) on the interrogated target. The gamma rays (γ) from these reactions are detected by at least one detector. During the (Mode 2) neutron pulse, the gamma ray spectrum is primarily composed of prompt gamma rays from the (n,n'γ) and (n,pγ) reactions of fast neutrons with elements such as C, O, and N. This spectral data is stored at a particular memory within the data acquisition system. Between pulses, some of the fast neutrons that are still within the object lose energy by collisions with light elements composing the object. When the neutrons have energy less than 1 eV, they are captured by such elements as H, S, N, Cl, and Fe through (n,γ) reactions. The prompt gamma rays from this set of reactions are detected by the same at least one detector, but stored at a different memory address within the data acquisition system. The procedure can be repeated with a different frequency, e.g., 10 kHz. After a predetermined number of pulses, there is a longer period that allows the detection of gamma rays emitted from the elements, such as O, Al, Si, and P, that have been activated. Therefore, by utilizing fast neutron reactions, neutron capture reactions, and activation, a large number of elements contained in an object can be identified in this remote, non-invasive technique.

With respect to Mode 3, the neutron generator produces neutrons, i.e., frequency of 200-400 Hz for between 25-200 µs, that interact with fissionable materials, e.g., $^{235}$U and $^{239}$Pu, within a target. At the end of the neutron pulse, neutrons emitted by any fissionable materials will be detectable and identifiable according to their characteristic decay curves.

Figure 3A:
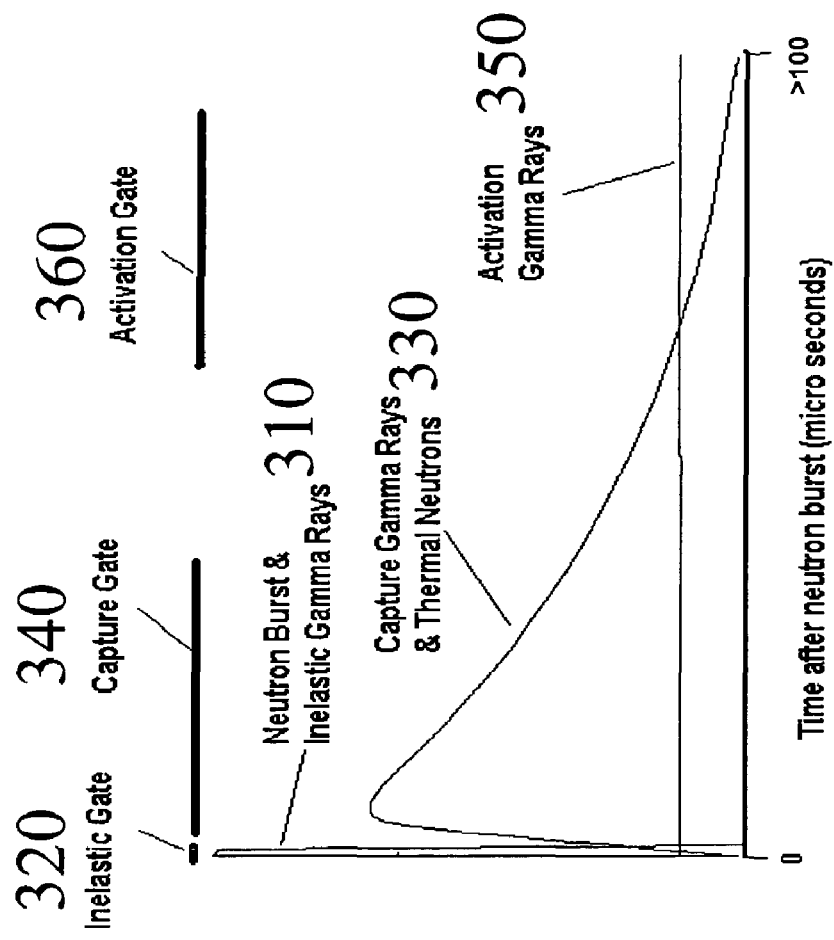
FIG. 3(a) shows a graph associated with emitted gamma rays according to an embodiment of the present invention.
Figure 3B:
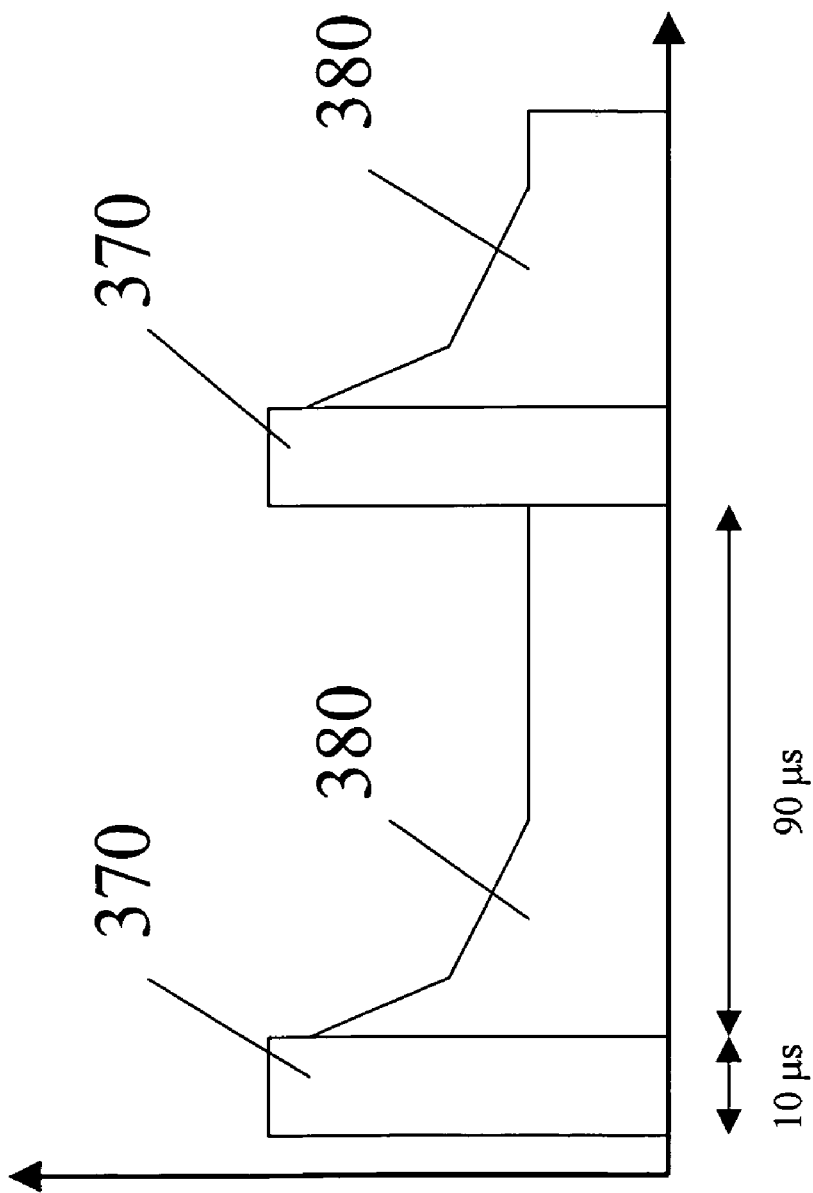
FIG. 3(b) shows a neutron capture versus time analysis for elemental identification according to an embodiment of the present invention.

Based on the resulting emissions from pulsed neutrons, the system identifies key elements, e.g., H, C, N, and O, which cannot be done with radioisotopic neutron sources. Advantageously, pulsed neutrons permit the separation—in time—of the gamma ray spectra/signatures produced by inelastic neutron scatter, neutron radiative capture, and induced activation. Referring to FIGS. 3(a) and (b), a graph is shown depicting the gates associated with the gamma rays during the time after a neutron burst. The pulsed neutron technology provides both fast neutron 370 and thermal neutron 380 capture analysis, which gives the broadest possible range of elemental identification. The "fast" neutron time 310 during a neutron burst and emission of inelastic gamma rays is characterized as an inelastic gate 320, and has a duration of approximately 10 µs. The "thermal neutron" time 330 during capture of the gamma rays and thermal neutrons is characterized as a capture gate 340, and has a duration of approximately 90 µs. The time when the level of capture gamma rays falls below activation gamma rays 350 is characterized as an activation gate 360.

The reactions happen immediately and are eliminated as soon as the neutron generator is turned "off." Between pulses, some of the fast neutrons are slowed down and thermalized, and may eventually be captured by nuclei in the target, producing gamma rays with different characteristic energies. The neutron generator can be switched "on" or "off," with no external radiation in the "off" position. An advantage to using the neutron generator is that the neutrons are produced "on demand." Because the neutrons are only produced when the high voltage is applied on the generator, there is no external radioactivity when there is no high voltage.

Additionally, neutrons have high penetrability and can traverse with ease the part of the cargo volume concealing a suspected anomaly. The incident neutrons interact with the nuclei of the various chemical elements in the anomaly, emitting the characteristic gamma rays, which act as the fingerprints of the various chemical elements. The incident neutrons interact with both the chemical elements in the anomaly and the surrounding cargo material. These interactions result in gamma rays that constitute the background of the measurement. It is necessary to use an appropriate configuration of the system to maximize the signal to background ratio.

A gamma ray detector 240 collects spectra data, e.g., gamma rays, from the target 220. The gamma ray detector 240 comprises a bismuth germinate ("BGO") or NaI scintillator coupled to a photomultiplier tube (not shown) to detect the gamma rays emitted by the target and its surroundings. The detector is gated to independently acquire the fast spectrum and the thermal spectrum. The neutron pulse duration is, e.g., 10 microseconds with a frequency of 10 kHz. The spectra can be acquired by counting for a period of time, e.g., 1 to 5 minutes, depending on the target type and size and container makeup. After converting the gamma ray signals from the BGO to digital energy information, they are collected in an energy spectrum histogram.

The gamma ray detector 240 is protected from the direct output of the pulsed neutron generator 210 by a line of sight shield stack or neutron shielding 260. During the neutron pulse, the gamma ray spectrum is primarily composed of gamma rays from inelastic scattering and neutron capture reactions on elements, e.g., C and O, and is stored at a particular memory location within the data acquisition system. An embedded controller 270 communicates the data with a remote computer or control pad 280, such as a laptop computer or handheld computer, for operation by a user. Embedded controller 270 comprises a computer system including a power supply and battery backup.

In one example, the neutron pulse generator emits 14.2 MeV neutrons in 10 µs pulses at a rate of 10,000 pulses per second. The neutrons excite the nuclei within the target (e.g., the nuclei of H, C, N, O, Si, Cl, Ca, Fe, and Al), which emit characteristic gamma rays detected by the gamma ray detectors. The gamma rays for each element have different energies, so it is possible to measure elemental ratios such as C/H, C/O, and H/Cl. For illicit drugs, these elemental ratios are distinctly different from those of innocuous materials and, therefore, pallets containing narcotics can be readily identified.

The ability to obtain reliable elemental information and induced gamma spectra depends on many factors, including size of the sample, available neutron flux, and detector resolution. Practical limitations inherent to field instruments make it difficult to interpret the spectra directly from published nuclear data. Accordingly, one relies on some form of calibration using spectra of known substances as a reference.

Conventionally, data analysis of the resulting gamma-ray spectra is performed with a program known as a spectrum deconvolution code. To utilize the program, one must first measure the response of the detector in question to γ rays from pure elements. For example, a block of pure graphite is used to determine the detector's response to the C γ rays. To determine the detector's response to elemental H, a response is measured from a water sample. In the absence of any sample placed in front of the detector, the detector records γ rays emanating from the material surrounding the detector, as well as from the materials inside and around the neutron generator. This spectrum is known as the background spectrum. The counts of the $i^{th}$ channel of the spectrum of a sample, S, can be represented by the equation:

$$S_i = k^* B_i + \sum_{j=1}^{n} c_j^* E_{i,j}$$

where $B_i$ is the background spectrum at the $i^{th}$ channel and k is its coefficient, $E_{i,j}$ is the response of the $j^{th}$ element at the $i^{th}$ channel and $c_j$ is its coefficient, and n is the total number of elements utilized to fit the spectrum. A least squares algorithm is used to fit this equation.

Primarily, identification of a substance is performed through examining the atomic ratios, e.g., the ratio of carbon atoms to oxygen atoms (C/O). The measurement of C/O is performed by taking the ratio of intensities for carbon and oxygen γ rays and then applying the ratio of the (n,n'γ) cross-sections for these elements.

Figure 4:
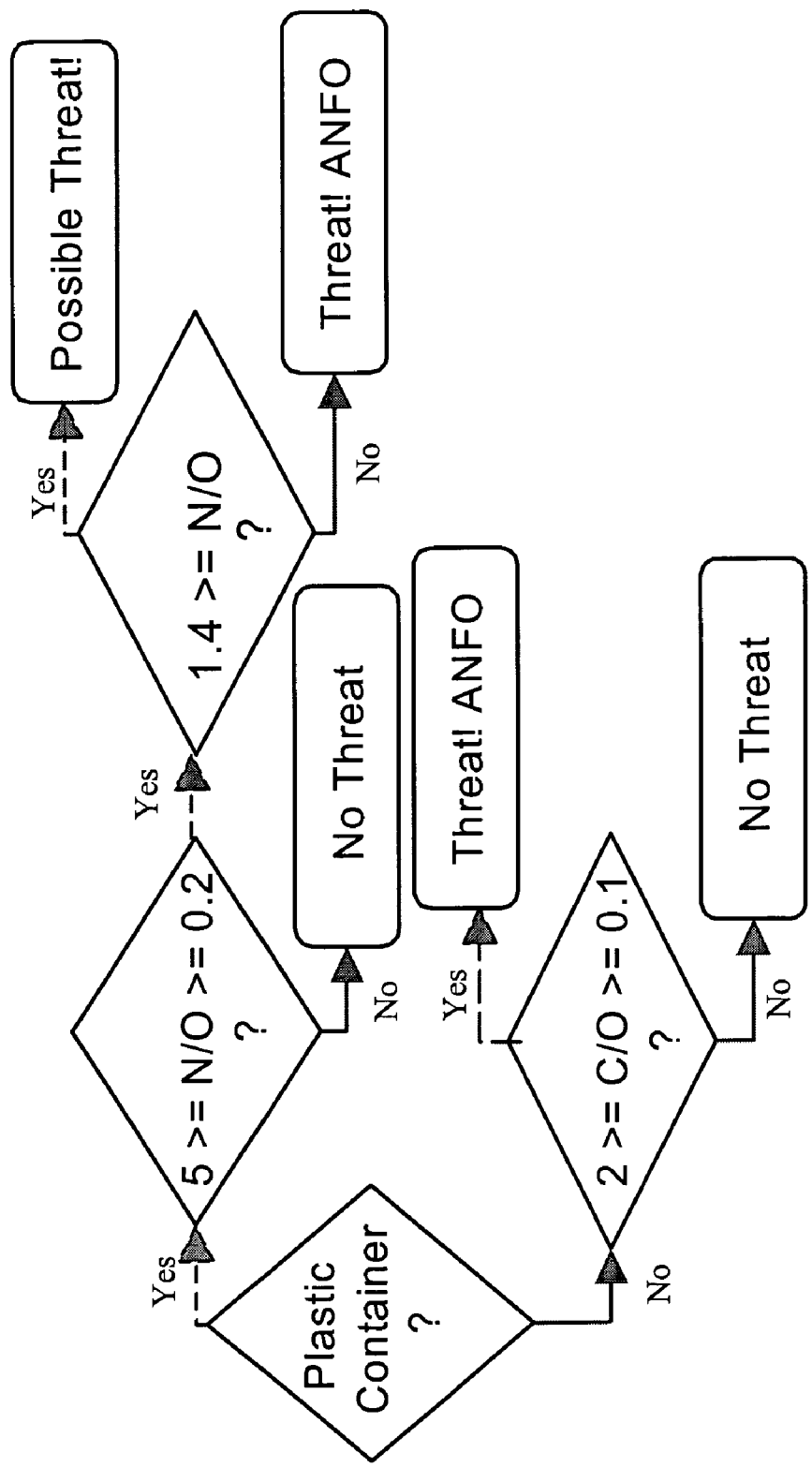
FIG. 4 shows a prior art decision tree.

The properties can then be analyzed using a decision tree, which is a set of rules or inequalities on the elemental intensities that is developed through inspection of the data along with trial and error. The development of a decision tree can be a laborious process because one needs to visualize data in multidimensional space. The decision tree code sets boundary limits for elemental responses and for characteristic elemental ratios. The decision tree progresses logically to deduce a result such as "Explosive Threat!", "TNT!", or "Drugs!". The responses can be dependent on the material of the container and its physical properties and other objects in the container that affect them. Attention is given to the background and the container, particularly if the amount of substance to be analyzed is small. Referring to FIG. 4, a conventional decision tree is shown for an ammonium nitrate fuel oil ("ANFO") bomb. Decision trees are not the same for all of the various conditions under which explosives can be found. For example, a decision making tree for an explosive ordnance on the ground is different than a decision tree for an explosive ordnance in water.

In the present invention, spectral analysis can be performed in two steps. First, the system extracts from the spectra a robust set of indicators. Second, the indicators can be correlated to the properties of the substance in question.

The system produces raw data and processed data. The raw data consists of spectra and the processed data may consist of elemental intensities. In certain situations, the signal due to the target is only a small fraction of the total measured signal. When the system is used to inspect explosive targets, especially if the targets are on the ground rather than on a table or other support, the background is a large portion of the sample spectrum. It is essential that the background effects be included in the analysis. Accordingly, the raw data for a target comprises a fast spectrum and a thermal spectrum for each the signal and the background. Visual inspection of signal and background spectra is useful to identify potential problems with the data and to check that the energy calibration is correct.

For a particular sample, one usually considers the combination of two spectra, one with the sample present (i.e., signal) and one taken in similar conditions without the sample (i.e., background). Spectral analysis reduces the information to a smaller set of numbers, which are known as "indicators," e.g., elemental intensities, which can be used as features to classify, identify, or otherwise characterize the sample. One approach may be based on an underlying physical model (i.e., some assumptions are made) and auxiliary measurements of the response functions must be available. The processed data, e.g., elemental intensities, are based on the assumption of a linear model and rely on the definition of elemental response functions. While the concept of elemental intensities has great appeal, mainly because it is based on nuclear arguments, the model from which it is derived is an approximation and its validity can be questioned.

As an alternative, the raw data (i.e., spectra) from an ensemble of measurements of known items can be used without any model or fit. The spectrum comprises a vector with a large number of components and contains information that allows for an inference of the nature of the substance in a container, e.g., explosive or inert, and identifies the substance. One simply uses the shape of the spectra in a pattern recognition mode without any attempt to interpret them according to a model. Various methods for analyzing spectral data are described herein.

In a first exemplary processing embodiment, once the gamma ray and neutron emission data is collected by the detector, the spectra is processed to identify contraband hidden among innocuous objects within the target. The spectra data are analyzed using a primary analysis application by performing a least squares analysis ("LSA"), which uses a library of gamma ray (and neutron) spectra for several chemical elements that are expected to be either in the background (e.g., other parts of the target) or in the target to be interrogated. The LSA extracts the contribution of different elemental species present in the sample. Spectral data analyzed using model dependent LSA requires measured response functions of each element and results in intensities of C, N, O, H, etc. The decision making process using deterministic rules based on elemental intensities and ratios is developed manually and can change depending on types of targets or the environment. The LSA method does not rely on any particular chemical element. Instead, LSA utilizes all chemical elements that are present or, in certain cases, absent from a spectrum.

For each measured spectrum and associated background, the output of the LSA provides a number of elemental intensities. For small amounts of explosive material or, in general, when the sample spectrum is not very different from the background, the elemental intensities are not directly proportional to the fraction of elements in the target. However, the intensities are useful indicators of elements represented in the spectra, and display correlation with some properties, e.g., explosive or inert, of the substances that produced the spectra.

Utilizing collected spectra data, based on the assumed linear model, a generic spectrum |s> can be written as follows:

$$|S> = c_1|R_1> + c_2|R_2> + \ldots + c_n|R_n>$$

where the $c_j$ are coefficients and $|R_1>\ldots|R>$ are generalized responses (in particular $|R_1>$ is the background). The equation above can be written as a matrix vector product, as follows:

$$|S> = R|c>$$

where R is a known matrix. If R were a square matrix, the solution would be $$|c> = R^{-1}|S>$$

Since R is not a square matrix, e.g., R may have four or five columns and hundreds of lines, corresponding to the channels in the spectrum, the system of equations is over determined. The matrix $R^T R$, where T indicates the transpose, is a square matrix, and the system can be solved in the least squares sense, as follows:

$$|c> = (R^T R)^{-1} R^T |S>$$

The vector |c> contains the indicators based on the LSA method. The LSA primary analysis application provides the results in counts/second for each chemical element of importance. The results are then used in a secondary analysis application to identify the target.

In a second exemplary processing embodiment, rather than requiring a model and response functions in the primary analysis application, features can be determined directly from a number of spectra of substances of interest, e.g., explosives and hazardous chemicals. The principal component analysis ("PCA") can be used to obtain indicators from the spectra. Decomposition of the spectra into principal components is an alternative to the characterization of the spectra by elemental intensities. In PCA, one relies on general features of the accumulated spectrum and not on the particular chemical elemental content of the anomaly under interrogation.

PCA is based on a particular expansion in terms of orthonormal functions. PCA uses an eigenvector approach to derive sets of indicators directly from the spectra, eliminating the need for a model and elemental response functions. The indicators are representative of the spectra and display correlation to the properties. The PCA method relies on general features of the accumulated spectrum and not on the particular chemical elemental content of the "anomaly" under interrogation. For a particular sample, one usually considers the combination of two spectra, one with the sample present (i.e., signal) and one taken in similar conditions without the sample (i.e., background). Every spectrum (or the difference between signal and background) can be represented as a weighted sum of basis vectors. If an adequate representation of a spectrum can be attained with only a small number of basis vectors, the coefficients of the expansion form a feature vector that can also be used to characterize the sample. Advantageously, this approach is completely heuristic and, accordingly, does not require any auxiliary measurements or underlying models. This means that, where the system is well trained, it is possible to analyze a target without relying on spectral deconvolution. The PCA technique allows for threat classification by directly responding to the data pattern classic to that type of target. This makes a PCA system more flexible and more responsive to a broader variety of targets.

More particularly, any vector, including a spectrum $|s>$, can be decomposed into a sum of vectors as follows:

$$|s> = c_1|P_1> + c_2|P_2> + \ldots + c_n|P_n>$$

where the $c_1 \ldots c_n$ coefficients are numbers, and the vectors $|P>\ldots |P>$ form an orthonormal basis. The above equation is true for any orthonormal set.

Many vectors $|S>$ can be arranged to form a matrix X. This matrix is not square, however. The matrix $X^TX$ that is proportional to the covariance of the matrix X (provided that the data has been mean centered) is square. The eigenvectors of this square covariance matrix by definition form an orthonormal set. They can be ordered in descending order according to the magnitude of the corresponding eigenvalues. The advantage of this procedure is that one does not need all of the eigenvectors to expand the spectra. Instead, a relatively small number of components may be sufficient for the spectral expansion, and most of the variance in the data is captured by the first few principal components. Once the principal components have been determined, a particular spectrum is represented by a small number of indicators, also known as "vector scores," which are obtained by projecting the vector onto the principal components, as follows:

$$c_i = >P_i|S>$$

Accordingly, applying the PCA method described above to the spectra data, a matrix of all the spectra data is formed, which also accounts for the background. The covariance of this matrix is calculated. The set of eigenvectors of the covariance matrix is computed and they are ordered in descending order by eigenvalue. A smaller subset of eigenvectors from the top of the ordered list is selected as the principal components. Finally, the data vector (spectrum) is projected on the above components. The PCA method extracts the group of indicators, i.e., vector scores, for each data vector. The PCA vector scores replace the elemental intensities obtained from the least squares approach, which are then processed by the secondary analysis application to classify the target contents.

In order to maximize the reliability of the results from the inspection system, the system utilizes a secondary analysis application that maximizes probability of detection and minimizes probability of false alarms. The secondary analysis application can use a generalized likelihood ratio test or support vector machines to render a decision on the contents of the target.

Based on LSA, PCA, or other spectral analysis, the generalized likelihood ratio test ("GLRT") offers a simpler and automated way of correlating the indicators to the material properties. The GLRT is a statistical analysis tool that allows hypothesis testing based on a ratio of two likelihoods: the likelihood that the data point of the target being evaluated is inert and the likelihood that the target is a real threat or contraband item. Applying GLRT to the detected data from the primary analysis application in conjunction with known materials, the target inspection system optimizes the probability of detection and minimizes the probability of false alarms. The training data sets are based on an elemental concentrations data bank established by interrogating a large number of innocuous objects as well as drugs, explosives, weapons of mass destruction, etc., i.e., known targets. Based on elemental concentrations, as well as several elemental ratios, the target inspection system is "trained" to distinguish contraband from innocuous objects. To apply the tool, one needs a set of representative data to train on, after which one selects a threshold and applies the tool to the stream of data points that follow. By moving the threshold, one can develop a receiver operating characteristic ("ROC") curve, which is a good indicator of the detection capability of the system. The ROC curve is a plot of detection probability versus false alarms.

By comparing the result of the declarations to the known state (e.g., explosive or inert) of the sample one can calculate the detection probability ("DP") and the probability of false alarms ("FA") for that particular threshold. The ROC curve is a global way of assessing the performance of both primary and secondary analysis applications. The GLRT method can then be used for making decisions on new data. If enough information is available for a range of different substances, the GLRT parameter can also be used for substance identification. The substance is identified as belonging to the class (e.g., explosive or inert) corresponding to the highest confidence.

GLRT separately calculates the probability density functions ("PDF") from different elements, e.g., explosive and inert. The ratio of the PDF of an explosive to an inert is substantially proportional to the likelihood that the interrogated sample is an explosive. This requires some a priori knowledge of target types that are desired to be identified. For each data point, which consists of measured elemental intensities, the quantity $\lambda$ can be computed. The quantity $\lambda$ is the logarithm of the ratio of two likelihoods, more specifically, the likelihood that a data point corresponds to an inert or an explosive. Since it is a statistical property, it can be computed from the statistical properties, e.g., mean and covariance, of the inert and explosive data sets. The value of λ can be used as a threshold and can represent a surface in the multi-dimensional space. The data points that fall on one side of the surface, e.g., above the threshold, can be declared explosives, while the remaining ones are considered inert. The distance of a point from the surface is an indication of the confidence in the decision. When a point lies exactly on the surface confidence is 50%.

The procedure for a decision is as follows. By way of example, using data from a PCA, a sample may comprise of a vector, W, with four components (C, H, N, and O intensities). The samples can include all of the measurements or a subset, e.g., all of the measurements made on a particular type of environment, such as on a concrete surface. The mean ($\mu$) and covariance (Cov) matrix for the explosives and inert items, respectively, are computed. Statistics under $H_0$ (inert) are represented by $\mu_0$ and $C_0$. Statistics under $H_1$ (explosive) are represented by $\mu_1$ and $C_1$. For a generic vector, W, compute:

$$\lambda = (W-\mu_1)^T (Cov_1)^{-1} (W-\mu_1) - (W-\mu_0)^T (Cov_0)^{-1} (W-\mu_0)$$

where T indicates the transpose. The decision statistic, λ, is applied to each data vector, W, and then the decision statistics are compared to a threshold level in a ROC curve. An advantage of the GLRT approach is that it provides a natural way of assessing performance through the ROC curve. If λ is less than the threshold level, the decision is explosive. If λ is greater than the threshold level, the decision is inert. A threshold value of λ is selected that corresponds to an acceptable level on the ROC curve, e.g., 10% false alarm, 80% detection probability.

Advantages to GLRT include the application to a number of dimensions, the parameters determining the decision can be obtained with a completely automated analysis, the method generates well-defined boundaries, and a confidence level can be associated with the decision once a threshold has been selected.

The decision is associated with the following confidence level:

$$\text{Confidence} = 0.50 + 0.50 \, \text{erf}\left(\frac{\text{abs}(\lambda - \text{Threshold})}{4\sqrt{2}}\right) \text{ where } \text{erf}(x) = \frac{2}{\sqrt{\pi}} \int_0^t e^{-f^1} dt$$

The confidence so defined varies from 0.50, i.e., when we are exactly at the threshold, to 1.

Figure 5C:
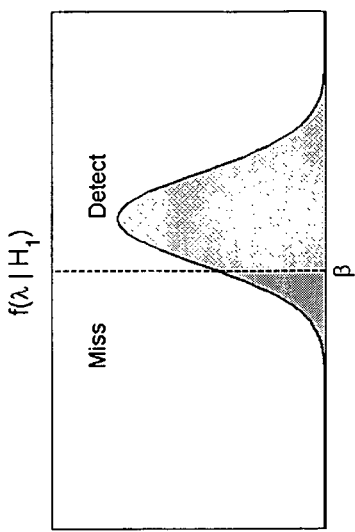
FIGS. 5(a)-(c) show PDFs according to an embodiment of the present invention.
Figure 5B:
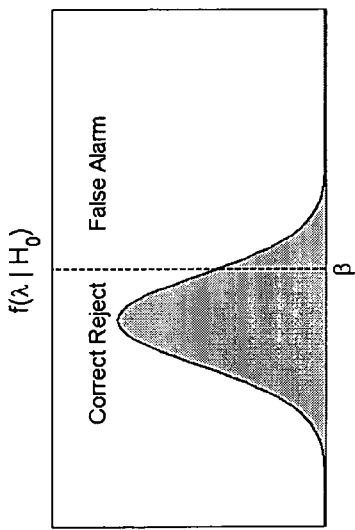

The conventional decision procedure for a two hypothesis problem is to compare the algorithm output, λ, to a fixed threshold, β, and declare $H_1$ if λ>β or $H_0$ if λ<β. Because there are only two decision regions, $H_0$ and $H_1$, only one threshold is required to separate them. Typical PDFs and decision regions, as well as the decision outcomes, are illustrated in FIGS. 5(a)-(c).

There are four possible decision outcomes: (1) Correct Rejection—Declare $H_0$ when the measurement results from $H_0$; (2) False Alarm—Declare $H_1$ when the measurement results from $H_0$; (3) Miss—Declare $H_0$ when the measurement results from $H_1$; and (4) Detection—Declare $H_1$ when the measurement results from $H_1$. Associated with each of these outcomes is the probability that it will occur. The probabilities are denoted as follows: probability of a correct rejection ("PCR"); probability of false alarm ("PFA"); probability of miss ("PM"); and probability of detect ("PD").

Figure 5A:
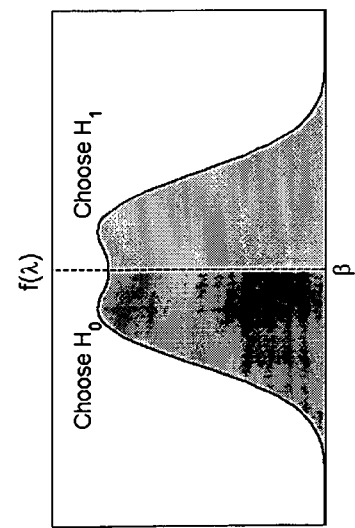

FIG. 5(a) depicts a PDF of λ for all data. If λ is greater than threshold β, $H_1$ is chosen. If λ is less than threshold β, then $H_0$ is chosen. FIG. 5(b) depicts a PDF of λ for $H_0$ data. If λ is greater than threshold β, it is a false alarm. If λ is less than threshold β, it is a correct reject. FIG. 5(c) depicts a PDF of λ for all $H_1$ data. If λ is greater than threshold β, it is a proper detection. If λ is less than threshold β, it is a miss.

Figure 6A:
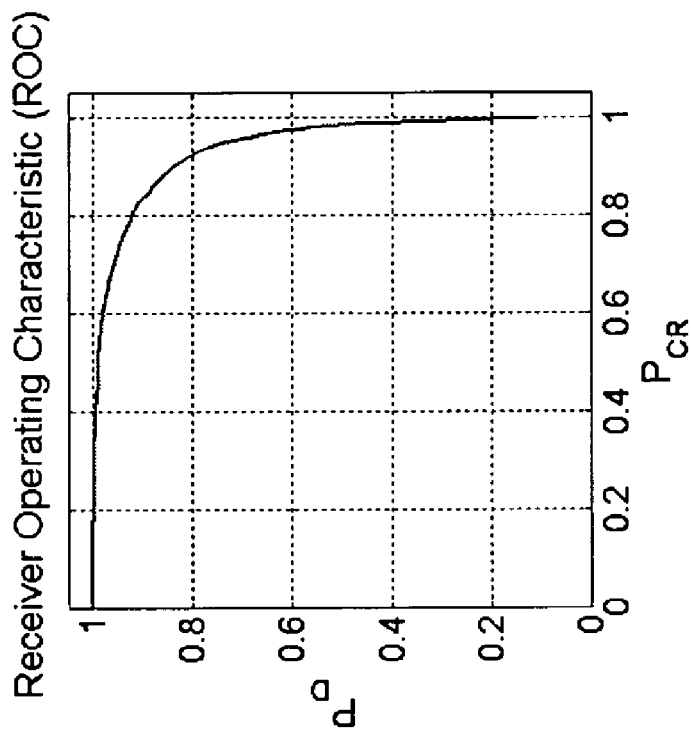
FIGS. 6(a)-(b) show ROC curves according to an embodiment of the present invention.

The ROC curve evaluates algorithm performance for a binary hypothesis test. Even though there are four decision outcomes and, therefore, four probabilities to assess performance, the two probabilities PD and PFA capture all of the information about the performance of the algorithm since PCR=1−PFA and PM=1−PD. In practice, the ROC curve is found by determining PD and PFA for a set of thresholds. The conventional ROC curve for the binary decision PDFs shown in FIGS. 5(a)-(c) is plotted in FIG. 6(a). The usual performance goal is to maximize the probability of making a correct decision, which is equivalent to maximizing detections while minimizing false alarms. Therefore, the closer a ROC curve is to the upper left corner of the graph, the better the algorithm performance. The perfect algorithm produces 100% detection with no false alarms.

Figure 6B:
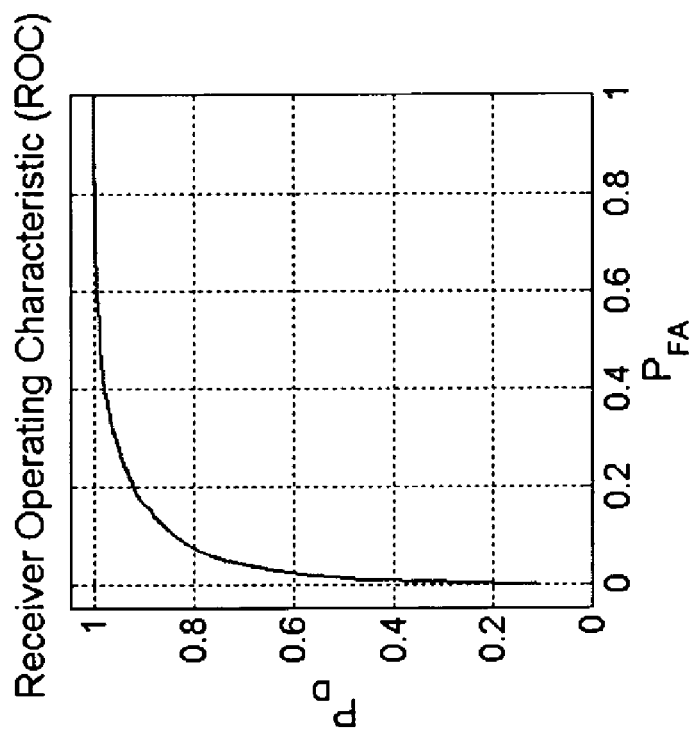

An alternate algorithm performance measure is an ROC curve which plots PD versus PCR, as illustrated by FIG. 6(b). For this performance measure, improved performance is indicated by the ROC curve being closer to the upper right corner of the graph since it is desirable to maximize detection while maximizing correct rejections. The perfect algorithm has 100% detection with 100% correct rejection. An equally valid alternate performance measure is PM versus PFA. For this convention, better-improved performance is indicated by lower PM and PFA, or being closer to the bottom left corner of the graph. For a PM versus PFA ROC curve, perfect performance is no misses and no false alarms.

In an alternative embodiment, a tertiary hypothesis test is utilized in place of the binary hypothesis test, where the decision is either "explosive" ("EX") or "inert" ("IN"). Utilizing a tertiary hypothesis test, the decision would include at least a third choice, such as "Unknown" or "Don't Know" ("DK"). DK is declared when confidence in an IN/EX decision is low. Because there are only two underlying hypotheses, e.g., inert or explosive, the classification algorithms are developed as they would be for the traditional binary hypotheses test. However, performance evaluation (e.g., ROC curves) must be modified. Tertiary decision changes scoring procedure, not algorithms.

Figure 7C:
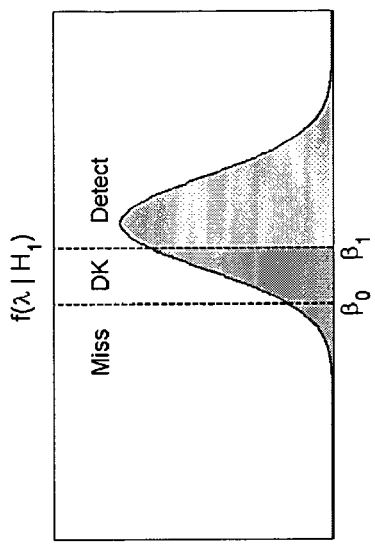
FIGS. 7(a)-(c) show PDFs according to an embodiment of the present invention.
Figure 7B:
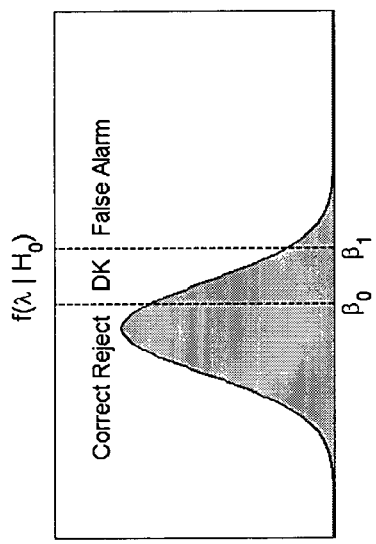
Figure 7A:
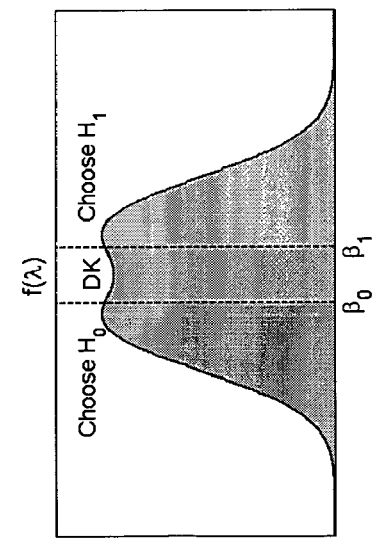

The tertiary decision introduces the third possible decision, DK, for a fixed percentage of the data. Two thresholds, which assign 25% of the data to the DK decision, $\beta_0$ and $\beta_1$, and the resulting decision regions and decision outcomes, are shown in FIGS. 7(a)-(c). FIG. 7(a) depicts a PDF of λ for all data. If λ is greater than threshold $\beta_1$, $H_1$ is chosen. If λ is less than threshold $\beta_0$, then $H_0$ is chosen. If λ is between $\beta_0$ and $\beta_1$, then it is a "Don't Know." FIG. 7(b) depicts a PDF of λ for $H_0$ data. If λ is greater than threshold $\beta_1$, it is a false alarm. If λ is less than threshold $\beta_0$, it is a correct reject. If λ is between $\beta_0$ and $\beta_1$, then it is a "Don't Know." FIG. 7(c) depicts a PDF of λ for all $H_1$ data. If λ is greater than threshold $\beta_1$, it is a proper detection. If λ is less than threshold $\beta_0$, it is a miss. If λ is between $\beta_0$ and $\beta_1$, then it is a "Don't Know."

The decision outcomes illustrate that a ROC curve (PD v. PFA) does not take the DK decision into account since both probabilities are determined with respect to $\beta_1$. It is necessary to assess performance using both thresholds so the impact of the third decision, i.e., DK, can be determined. Since PCR depends on $\beta_0$ while PD depends on $\beta_1$, the alternate convention, PD v. PCR, is appropriate for measuring algorithm performance. However, the alternate convention ignores a portion of the available data when determining PD and PCR.

Figure 8:
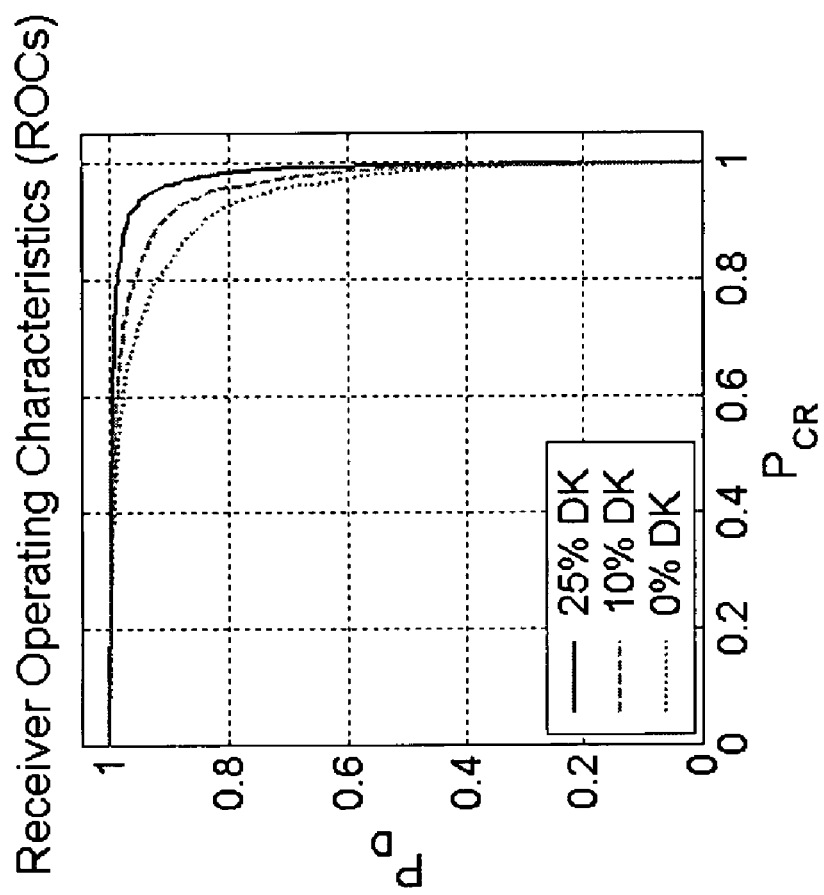
FIG. 8 shows a ROC curve according to an embodiment of the present invention.

Consequently, performance improves because the region in which it is most difficult to distinguish between the two hypotheses is the region in which the data is ignored. As the percentage of the data ignored decreases, the ROC curve falls, until it becomes identical to the binary decision ROC when none of the data is ignored. Referring to FIG. 8, exemplary tertiary decision ROC curves are obtained when 25%, 10%, and 0% of the data is declared DK. Note that when 0% of the data is ignored, the ROC is identical to the ROC for the binary decision in FIG. 6(b).

Figure 9A:
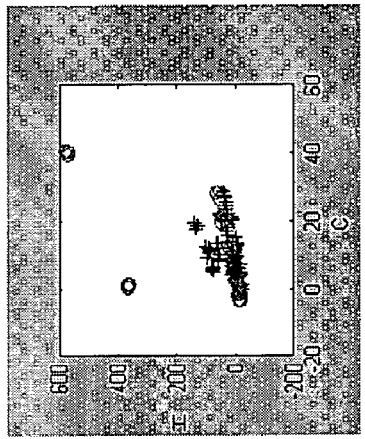
FIGS. 9(a)-(c) show exemplary elemental intensities according to an embodiment of the present invention.
Figure 9B:
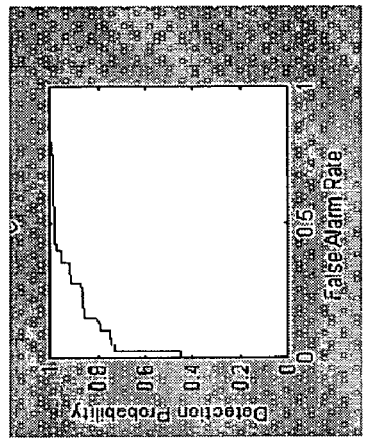
Figure 9C:
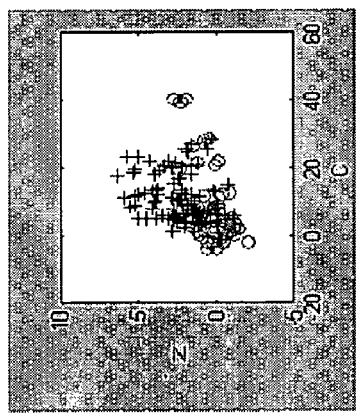
Figure 9D:
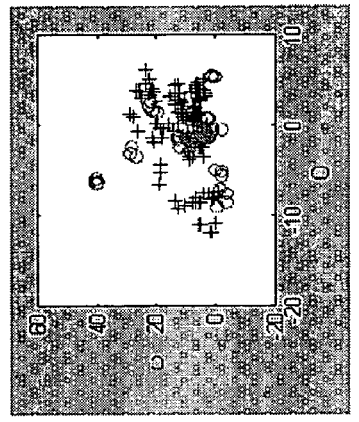
FIG. 9(d) shows an exemplary ROC curve derived through an embodiment of the present invention.

In an exemplary embodiment, FIGS. 9(a)-(c) depict distributions of elemental intensities for a plurality of targets placed in various concealments and situated on concrete. A "+" represents a target with explosives. A "o" represents a target without explosives. FIG. 9(d) depicts a corresponding ROC curve obtained by the GLRT method for the set of exemplary data taken with the targets interrogated in FIGS. 9(a)-(c). In these measurements, the concealment was not included in the background. This situation is considered more realistic because, in the field, a concealment matching that containing the target may not be readily available for the background measurement.

An alternative to GLRT is support vector machines ("SVMs"). One issue with the use of the likelihood ratio for decision making is the necessity for determining the probability density functions that describe the data under each condition of uncertainty. These probability density functions are used to define the decision boundary that separates target decisions from non-target decisions. This involves developing a probability density function describing the count data for at least each type of explosive. As an alternative, SVMs are alternative means of determining decision boundaries. SVMs map their multi-dimensional input space nonlinearly into a high dimensional feature space. In this high dimensional feature space, a linear classifier is constructed. Thus, once training is performed, execution of the algorithm is computationally inexpensive. SVMs can perform binary decision tasks, and the associated relevance vector machines ("RVMs") can be used to formulate decision tasks. SVMs have been shown to provide excellent performance and to be robust to limited training sets.

When the data is analyzed, a computer screen can provide the results of the secondary analysis application to the user. In one exemplary embodiment, a computer screen can display the interrogation results and alert the user to the presence of contraband by stating "Contraband Detected!" In another exemplary embodiment, the computer screen identifies the material and provides its chemical composition for the confirmation of the operator, along with an indication of the confidence level of the reading.

The embodiments described above are intended to be exemplary. One skilled in the art recognizes that numerous alternative components and embodiments that may be substituted for the particular examples described herein and still fall within the scope of the invention.

What is claimed is:

1. A method for analyzing target interrogation data, the method comprising:
    irradiating a target with neutrons;
    collecting target interrogation data, wherein the target interrogation data comprises spectra that is representative of the contents of the target;
    performing a primary analysis of the spectra according to a least squares analysis to determine a first set of elemental intensities representative of the contents of the target;
    performing a secondary analysis of the spectra utilizing the first set of elemental intensities by comparing the first set of elemental intensities from the target to a second set of elemental intensities for known spectra wherein the secondary analysis is a tertiary hypothesis test; and
    classifying the contents of the target based on the secondary analysis comparison.

2. The method according to claim 1, wherein classifying the target further comprises the step of determining whether the target contains explosives, chemical warfare agents, or illicit drugs.

3. The method according to claim 1, wherein spectra is emitted from at least one element of the target selected from the group consisting of H, C, N, O, S, Cl, Fe, Al, Si, and P.

4. The method according to claim 1, further comprising the step of providing a library of spectra for at least one element.

5. The method according to claim 1, further comprising the step of plotting a receiver operating characteristic curve.

6. The method according to claim 1, wherein the spectra are gamma ray spectra.

7. A method for analyzing target interrogation data, the method comprising:
    irradiating a target with neutrons;
    collecting target interrogation data, wherein the target interrogation data comprises spectra that is representative of the contents of the target;
    performing a primary analysis of the spectra according to a principal component analysis to determine a first set of vectors representative of the contents of the target;
    performing a secondary analysis of the spectra utilizing the first set of vectors by comparing the first set of vectors from the target to a second set of vectors for known spectra; and
    classifying the contents of the target based on the secondary analysis comparison.

8. The method according to claim 7, wherein the secondary analysis is a generalized likelihood ratio test or support vector machines.

9. The method according to claim 7, wherein classifying the target further comprises the step of determining whether the target contains explosives, chemical warfare agents, or illicit drugs.

10. The method according to claim 7, wherein spectra is emitted from at least one element of the target selected from the group consisting of H, C, N, O, S, Cl, Fe, Al, Si, and P.

11. The method according to claim 7, further comprising the step of plotting a receiver operating characteristic curve.

12. The method according to claim 7, wherein the secondary analysis is a binary hypothesis test.

13. The method according to claim 7, wherein the secondary analysis is a tertiary hypothesis test.

14. The method according to claim 7, wherein the spectra are gamma ray spectra.

15. An interrogation system for determining the contents of a target comprising:
    at least one pulsed neutron generator;
    at least one detector configured to provide spectra representative of the target;
    a primary analysis application to perform a least squares analysis of the spectra to determine a first set of elemental intensities representative of the contents of the target; and
    a secondary analysis application to perform an analysis of the spectra utilizing the first set of elemental intensities by comparing the first set of elemental intensities from the target to a second set of elemental intensities for known spectra wherein the secondary analysis is a tertiary hypothesis test;

wherein the system classifies the contents of the target based on the secondary analysis application comparison.

16. The interrogation system according to claim 15, wherein the system classifies the target to determining whether the target contains explosives, chemical warfare agents, or illicit drugs.

17. The interrogation system according to claim 15, wherein spectra is emitted from at least one element of the target selected from the group consisting of H, C, N, O, S, Cl, Fe, Al, Si, and P.

18. The interrogation system according to claim 15, further comprising a library of spectra for at least one element.

19. The system according to claim 15, wherein the secondary analysis application plots a receiver operating characteristic curve.

20. The system according to claim 15, wherein the spectra are gamma ray spectra.

21. An interrogation system for determining the contents of a target comprising:

at least one pulsed neutron generator;

at least one detector configured to provide spectra representative of the target;

a primary analysis application to perform a principal component analysis to determine a first set of vectors representative of the contents of the target; and a secondary analysis application to perform an analysis of the spectra utilizing the first set of vectors be comparing the first set of vectors from the target to a second set of vectors for known spectra;

wherein the system classifies the contents of the target based on the secondary analysis application comparison.

22. The interrogation system according to claim 21, wherein the secondary analysis application utilizes a generalized likelihood ratio test or support vector machines.

23. The interrogation system according to claim 21, wherein the system classifies the target to determining whether the target contains explosives, chemical warfare agents, or illicit drugs.

24. The interrogation system according to claim 21, wherein spectra is emitted from at least one element of the target selected from the group consisting of H, C, N, O, S, Cl, Fe, Al, Si, and P.

25. The interrogation system according to claim 21, wherein the secondary analysis application plots a receiver operating characteristic curve.

26. The interrogation system according to claim 21, wherein the secondary analysis application utilizes a binary hypothesis test.

27. The interrogation system according to claim 21, wherein the secondary analysis utilizes a tertiary hypothesis test.

28. The system according to claim 21, wherein the spectra are gamma ray spectra.

* * * * *